May 29, 1923.
W. H. GOSS
1,456,981
RODENT TRAP
Filed Nov. 23, 1921
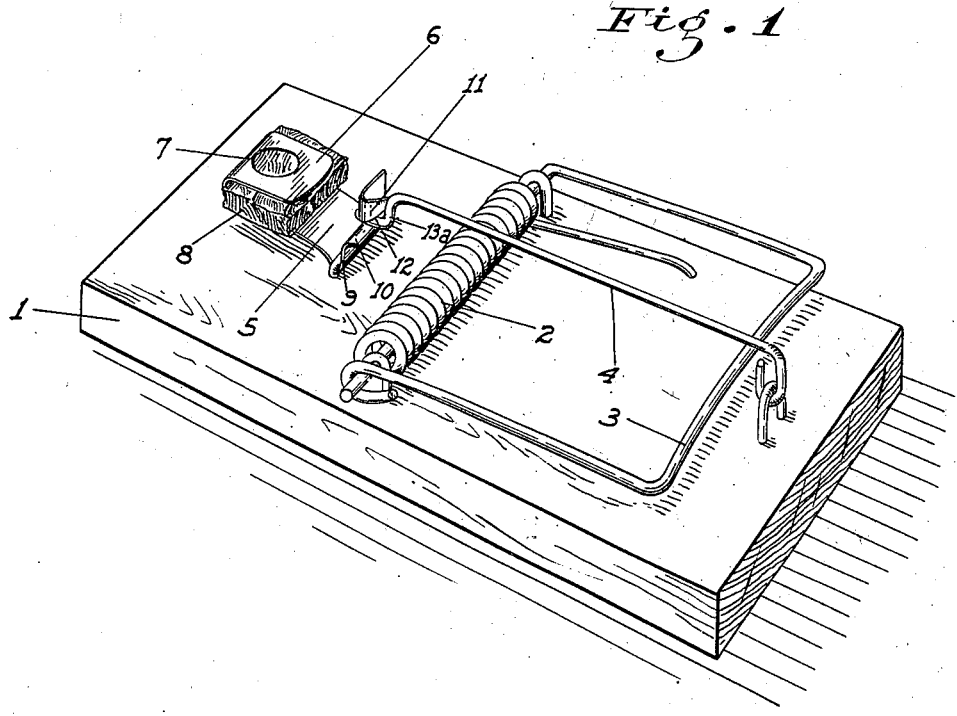
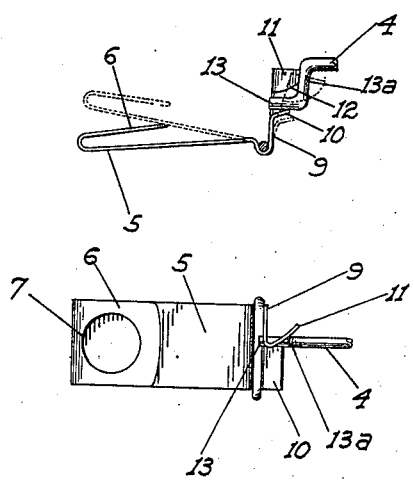
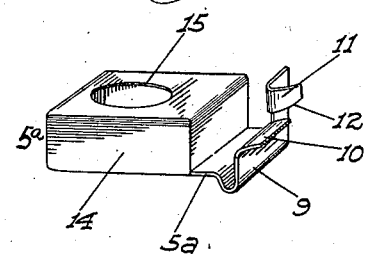
INVENTOR.
William H. Goss
BY
ATTORNEY Patented May 29, 1923.

1,456,981

UNITED STATES PATENT OFFICE.

WILLIAM HENRY GOSS, OF HAMMONTON, CALIFORNIA.

RODENT TRAP.

Application filed November 23, 1921. Serial No. 517,184.

*To all whom it may concern:*

Be it known that I, WILLIAM H. GOSS, a citizen of the United States, residing at Hammonton, county of Yuba, State of California, have invented certain new and useful Improvements in Rodent Traps; and I do declare the following to be a full, clear, and exact description of the same, reference being had to the accompanying drawings and to the characters of reference marked thereon, which form a part of this application.

This invention relates to improvements in rodent traps of the well known spring type, and is particularly an improvement over that type of trap shown in my United States Patent No. 1,316,788, dated September 23rd, 1919.

The principal object of the present invention is to provide a treadle or spring-release trigger device so arranged that the spring may be set without necessitating manual manipulation or holding of the treadle, thereby preventing injury to the hand of the operator by possible accidental tripping or release of the spring actuated catch bar before it is firmly set.

Another object is to provide such a trigger-mechanism as will release the spring when the treadle is pressed either up or down.

A further object is to arrange the bait holding portion of the treadle in such a manner that the bait may be held against removal by the rodent, and in its efforts to so remove it, will cause the trap to be sprung.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective elevation of a trap, showing my improved features.

Fig. 2 is a detached side view of the treadle and trigger member.

Fig. 3 is a top plan view of the same.

Fig. 4 is a perspective view of a modified form of treadle, showing a different form of bait retaining member.

Referring now more particularly to the characters of reference on the drawings, the numeral 1 denotes a base member of any suitable form and size, having fixed transversely thereon the usual form of coiled spring 2 adapted to engage the transverse trapping-bar 3 in the usual manner. A rod or lever 4 is flexibly mounted at one end on the base and is adapted to engage the bar 3 and hold it against undesired release when the spring is under tension, as is customary. The foregoing parts are standard construction, and of themselves form no part of my invention.

This latter lies in the manner of setting and holding this lever or rod, and comprises a treadle-plate 5 pivoted at one end to the base in a plane transversely to that of the lever, or parallel to the spring 2, and therebeyond. The end of the treadle opposite to its pivotal connection is turned up and then over onto itself to form an upper plate 6, the latter being provided with an orifice 7, and the space between the two plates being ample to receive a piece of bait 8, such as cheese and the like, therebetween.

Just beyond the pivotal connection of the treadle with the base, the former is bent upwardly to form a substantially vertical portion 9, a part of which is bent away from the plate 5 but substantially horizontal thereto to form a lip 10, this lip extending for practically half the width of member 9.

The remaining portion of the member 9, above and to one side of the lip 10, has an ear 11 positioned in a vertical plane, and bent away from the lip 10, at an acute angle to but formed with the member 9 and on the same side of said member as said lip, the under edge of the ear being horizontal for a short distance from its connection with the member 9, and then sloping upwardly to its outer end, as shown at 12.

The free end of the lever 4 has an offset catch portion 13 below the plane of the major portion of said lever, but substantially parallel thereto. The outer end of this offset portion, when the lever is projected over the spring to hold the bar 3 locked, will reach to and rest on the lip 10 without the necessity of the operator touching the treadle in any way, and while the latter is resting on the base 1. In this position of the treadle the lip projects rearwardly at a slight upward angle, so that when the lever catch is moved to rest thereon, and a slight downward pressure given to said lever, the treadle will automatically be raised to its set position; and if at the same time the lever is shifted to one side to pass the catch under the ear 11 and at once released, the lever and treadle will remain in that set position, due to the binding caused by the upward pressure of the spring 2 thereagainst.

Now if the treadle is depressed, the member 9 of the treadle will be moved away from the end of the lever catch, causing the beveled or sloping edge of the ear 11 to be contacted with the catch, and the constantly acting pressure of the spring 2 will cause the lever to be at once thrown to one side and away from the plane of the ear, thus releasing the spring, and actuating the trap.

Now if the treadle should be raised, the angled ear will bear against the vertical or right angle connection 13$^a$ of the main lever 4 with its catch 13, and will cause the catch to be shoved to one side and beyond the ear, thus again releasing the spring.

In the type of treadle 5$^a$ shown in Fig. 4, the catch holding means is identical with that shown, but the bait holding portion is shown as a box or receptacle 14, to receive soft bait of a character inclined to run, access to this box being had by reason of a hole 15 in the upper face thereof.

It will of course be understood that while I have shown a trap of a size and form adapted to catch mice and rats, a trap working on this principle may be made of any size desired, to adapt it to entrap different animals.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rodent trap including a spring controlled trap bar, a lever adapted to bear against and hold the bar against movement when the spring is in tension, a bait retaining treadle pivoted for vertical movement beyond the lever, a lip on the treadle above the level thereof and projecting beyond the pivotal connection thereof toward the lever, the end of the latter being adapted to be contacted with said lip, and an ear on the treadle to one side of and above the lip and under which the said end of the lever may then be slid to set the trap.

2. A rodent trap including a spring controlled trap bar, a lever adapted to bear against and hold the bar against movement when the spring is in tension, a bait retaining treadle pivoted for vertical movement beyond the lever, an ear on the treadle under which the said end of the lever is adapted to be moved to set the trap, and means on the treadle whereby the latter may be raised to a set position and the end of the lever engaged with the ear without manual or direct manipulation of the treadle.

3. A rodent trap including a spring controlled trap bar, a lever adapted to bear against and hold the bar against movement when the spring is in tension, a bait retaining treadle pivoted for vertical movement beyond the lever, an ear on the treadle under which the said end of the lever may be slid to set the trap, the ear being disposed vertically and at an acute angle to the plane of the lever and the under edge thereof sloping upwardly toward its outer end, a vertical offset on the lever adjacent the treadle end thereof adapted to rest against the vertical face of the ear, and a horizontal catch extension on the lower end of the offset member adapted to bear against the under edge of the ear.

In testimony whereof I affix my signature.

WILLIAM HENRY GOSS.